United States Patent
Urushibara et al.

(10) Patent No.: US 9,835,070 B2
(45) Date of Patent: Dec. 5, 2017

(54) BREATHER HOSE FOR AQUEOUS UREA SOLUTION TANK

(75) Inventors: Hiroshi Urushibara, Tokyo (JP); Munetomo Matsunami, Tokyo (JP); Kazuhiro Kodaira, Tokyo (JP)

(73) Assignees: HINO MOTORS, LTD., Hino-shi (JP); ISUZU MOTORS LIMITED, Tokyo (JP)

( * ) Notice: Subject to any disclaimer, the term of this patent is extended or adjusted under 35 U.S.C. 154(b) by 124 days.

(21) Appl. No.: 14/241,098

(22) PCT Filed: Sep. 3, 2012

(86) PCT No.: PCT/JP2012/005554
§ 371 (c)(1),
(2), (4) Date: Feb. 26, 2014

(87) PCT Pub. No.: WO2013/035297
PCT Pub. Date: Mar. 14, 2013

(65) Prior Publication Data
US 2015/0007901 A1    Jan. 8, 2015

(30) Foreign Application Priority Data
Sep. 6, 2011 (JP) .................. 2011-193938

(51) Int. Cl.
*B65D 90/34* (2006.01)
*F01N 3/28* (2006.01)
(Continued)

(52) U.S. Cl.
CPC ......... *F01N 3/2896* (2013.01); *F01N 3/2066* (2013.01); *F16L 3/00* (2013.01);
(Continued)

(58) Field of Classification Search
CPC ... B65D 25/465; F01N 3/2066; F01N 3/2896; F01N 2610/1466; F01N 2610/1406; F01N 2610/02; F01N 2610/1413; Y02T 10/24
(Continued)

(56) References Cited

U.S. PATENT DOCUMENTS 3,134,519 A * 5/1964 Tidd ............... B05B 9/0816
                                              222/397
4,066,080 A * 1/1978 Sneider .......... A61M 3/0262
                                              222/105
(Continued)

FOREIGN PATENT DOCUMENTS

CN    101410599 A    4/2009
EP    2 006 502 A    12/2008
(Continued)

OTHER PUBLICATIONS

International Search Report issued Oct. 2, 2012, in PCT/JP2012/005554, filed Sep. 20, 2012.

*Primary Examiner* — Charles P Cheyney
(74) *Attorney, Agent, or Firm* — Oblon, McClelland, Maier & Neustadt, L.L.P.

(57) ABSTRACT

A pressure-releasing breather hose 1 mounted on a urea water tank 2 is dividably constituted by a flexible joint portion 1a with an end capable of being fitted over a hose joint 3 on the tank 2, and a vertical portion 1b connected to the other end of the joint portion 1a and suspending downward along a side surface of the tank 2. The joint and vertical portions 1a and 1b are constituted by a rubber hose made of ethylene propylene diene terpolymer (EPDM) and a polyethylene pipe (resin pipe) made of high density polyethylene (HDPE), respectively.

4 Claims, 3 Drawing Sheets

(51) Int. Cl.
*F01N 3/20* (2006.01)
*F16L 3/00* (2006.01)

(52) U.S. Cl.
CPC .. *B01D 2251/2067* (2013.01); *F01N 2610/02* (2013.01); *F01N 2610/1406* (2013.01); *F01N 2610/1466* (2013.01); *Y02T 10/24* (2013.01)

(58) Field of Classification Search
USPC .......... 138/106, 109; 222/320, 464.1–464.7, 222/538, 529, 530; 60/295; 220/745–750
See application file for complete search history.

(56) References Cited

U.S. PATENT DOCUMENTS

| | | | | |
|---|---|---|---|---|
| 4,805,814 A | * | 2/1989 | Allen, Sr. | B05B 7/244 222/464.1 |
| 4,834,269 A | * | 5/1989 | Cone | B65D 1/12 220/771 |
| 5,649,664 A | * | 7/1997 | Brass | B05B 1/3046 222/401 |
| 5,651,908 A | * | 7/1997 | Mansfield | B05B 9/0426 222/383.3 |
| 6,170,706 B1 | * | 1/2001 | Havlovitz | B05B 9/0426 222/109 |
| 6,708,713 B1 | * | 3/2004 | Gericke | B60K 15/03519 137/202 |
| 7,544,328 B2 | * | 6/2009 | Osaku | B01D 53/9431 422/509 |
| 7,594,594 B2 | * | 9/2009 | Troost | A61K 8/11 206/219 |
| 7,600,656 B2 | * | 10/2009 | Karl | A45F 3/18 222/175 |
| 7,958,905 B2 | * | 6/2011 | Osaku | F01N 3/2066 137/15.26 |
| 8,360,087 B2 | * | 1/2013 | Kolberg | F01N 3/2066 137/177 |
| 8,967,181 B2 | * | 3/2015 | Wetzel | B60K 15/03519 137/202 |
| 9,186,632 B2 | * | 11/2015 | Schroeder | B60K 15/03504 |
| 9,315,098 B2 | * | 4/2016 | Lee | B60K 15/03519 |
| 9,376,950 B2 | * | 6/2016 | Ogawa | B01D 35/005 |
| 2009/0019840 A1 | | 1/2009 | Osaku et al. | |
| 2009/0038296 A1 | * | 2/2009 | Fukuda | B60K 15/035 60/295 |
| 2012/0318813 A1 | * | 12/2012 | Amagasaki | F01N 3/2066 220/746 |

FOREIGN PATENT DOCUMENTS

| | | |
|---|---|---|
| JP | 45-20322 | 8/1970 |
| JP | 55-36716 | 3/1980 |
| JP | 57-127969 | 8/1982 |
| JP | 6-53251 | 7/1994 |
| JP | 2007-270744 A | 10/2007 |
| JP | 2009-144654 | 7/2009 |
| WO | WO 2011/078235 A1 | 6/2011 |
| WO | WO 2011/078236 A1 | 6/2011 |

* cited by examiner

BREATHER HOSE FOR AQUEOUS UREA SOLUTION TANK

TECHNICAL FIELD

The present invention relates to a breather hose for a urea water tank.

BACKGROUND ART

Conventionally, some diesel engines are provided with selective reduction catalyst incorporated in an exhaust pipe for exhaust gas flow and having a property of selectively reacting $NO_x$ with a reducing agent even in the presence of oxygen; a required amount of reducing agent is added upstream of the reduction catalyst and is reacted on the catalyst with $NO_x$ (nitrogen oxides) in the exhaust gas to thereby reduce a concentration of the discharged $NO_x$.

In a field of, for example, an industrial plant with flue-gas denitration, it has been well known that ammonia ($NH_3$) is effectively used as reducing agent to reduce and depurate $NO_x$. However, for automobiles, safety in running with ammonia itself on board is difficult to ensure, so that, in recent years, nontoxic urea water has been used as reducing agent for selective reduction catalyst.

More specifically, if the urea water is added to the exhaust gas upstream of the selective reduction catalyst, the urea water is decomposed in the exhaust gas into ammonia and carbon dioxide gas under a temperature condition of about 170° C. or more, and $NO_x$ in the exhaust gas is satisfactorily reduced and depurated by the ammonia on the catalyst.

In such use of the urea water as reducing agent, the urea water is fed from an on-board urea water tank through a urea water supply line to an upstream side of the selective reduction catalyst. This kind of urea water tank is provided with a breather hose which allows air in the tank to escape outside for pressure releasing during a water supply operation.

Generally used as the breather hose is a rubber hose made from, for example, ethylene propylene diene terpolymer (EPDM). The hose has an end connected to an upper portion of the urea water tank and has the other end opened and suspending downward, so that the tank is opened at the upper portion to atmosphere and is prevented from being invaded by outer foreign matters as much as possible.

There exists, for example, the following Patent Literature 1 as a prior art literature pertinent to this kind of breather hose for a urea water tank.

CITATION LIST

Patent Literature

[Patent Literature 1] JP 2007-270744A

SUMMARY OF INVENTION

Technical Problems

However, in such urea water tank with a breather hose, when the urea water in the tank is waved due to vibrations or the like during running and urea-water droplets happen to flow into the breather hose, then the urea-water droplets flowing downward through the hose may dehydrate and precipitate urea crystals near a lower end of the hose where further droplets may flow down to provide repeated dehydration and increase in precipitated urea crystals, disadvantageously resulting in clogging of the breather hose and non-smooth discharging of air during the water supply operation and thus failing in prompt water supply to the urea water tank and in finishing of the water supply operation in a short period of time.

More specifically, an inside of the breather hose is less humid and more liable to dehydrate as it is closer to the lower end of the hose opened to the atmosphere. Thus, the urea-water droplets not flowing through but lingering near the lower end of the breather hose proceed to dehydration and precipitation of urea crystals. The crystallization develops with the firstly precipitated urea crystals serving as core, resulting in clogging of the breather hose.

It has been revealed that this kind of clogging due to the urea crystals cannot be prevented by mere enlargement in opening area of the breather hose since the clogging results from time-dependent development of the firstly precipitated urea crystals.

The invention was made in view of the above and has its object to provide a breather hose for an urea water tank capable of preventing clogging due to the precipitated urea crystals.

Solution to Problems

The invention is directed to a pressure-releasing breather hose for a urea water tank, characterized in that it dividably comprises a flexible joint portion with an end capable of being fitted over a hose joint on an upper portion of the urea water tank, and a vertical portion connected to the other end of said joint portion and suspending downward along a side surface of the urea water tank, the joint and vertical portions being constituted by a rubber hose and a resin pipe, respectively.

Thus, even if the urea water is waved in the urea water tank due to vibrations or the like during running and urea-water droplets happen to flow into the breather hose, urea-water droplets tend to hardly linger halfway of the vertical portion and receive the vibrations or the like during the running to flow through with a high degree of certainty since the vertical portion suspending downward along the side surface of the urea water tank is constituted by the resin pipe. Thus, precipitation of the urea crystals near the lower end of the breather hose is suppressed to prevent beforehand clogging of the breather hose due to time-depending development of the urea crystals.

Moreover, only the vertical portion of the breather hose may be constituted by the resin pipe; as to the joint portion, any existing rubber hose may be utilized, so that production cost may be made relatively low.

The joint portion with the one end fitted over the hose joint on the upper portion of the urea water tank has a highly humid inside which causes no precipitation of urea crystals, so that there is no fear of clogging even if the joint portion is constituted by the rubber hose as is the case with the prior art.

The resin pipe is preferably a polyethylene pipe. Then, owing to high water-repellent property possessed by the polyethylene pipe, the urea-water droplets further hardly linger halfway of the vertical portion, and receive vibrations or the like during running to flow through with higher degree of certainty.

Further, in the invention, preferably the joint portion is preformed such that the joint portion has the one end extending straight over a required length in a projecting direction of the hose joint and has the other end bent downward, which makes it possible to beforehand prevent fold and clogging of a connection between the one end of the joint portion and the hose joint on the upper portion of the urea water tank as well as a connection between the other end of the joint portion and the vertical portion.

Advantageous Effects of Invention

According to a breather hose for a urea water tank of the invention, various excellent effects may be obtained as mentioned below.

(I) Precipitation of the urea crystals near the lower end of the breather hose can be suppressed to prevent beforehand clogging of the breather hose. Moreover, when only the vertical portion of the breather hose is constituted by a resin pipe and any existing rubber hose is utilized for the joint portion, production cost may be made relatively low.

(II) When the resin pipe is constituted by a polyethylene pipe, owing to high water-repellent property possessed by the polyethylene pipe, the urea-water droplets may flow through with higher degree of certainty without lingering halfway of the vertical portion, so that precipitation of the urea crystals near the lower end of the breather hose may be further suppressed.

(III) When the joint portion is preformed such that the joint portion extends straight at its one end over a required length in a projecting direction of the hose joint and is bent downward at the other end, then prevented beforehand are fold and thus clogging of a connection between the one end of the joint portion and the hose joint on the upper portion of the urea water tank as well as a connection between the other end of the joint portion and the vertical portion.

DESCRIPTION OF EMBODIMENT

An embodiment of the invention will be described in conjunction with the drawings.

Figure 1:
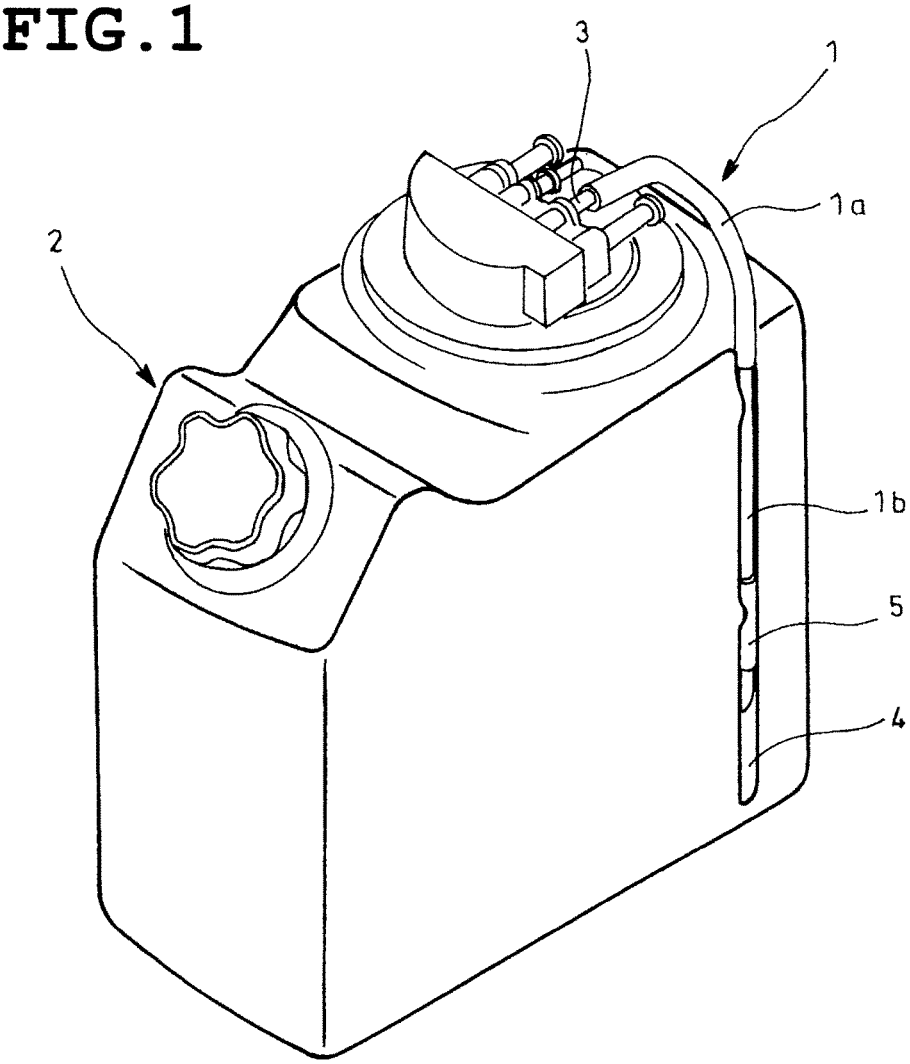
FIG. 1 is a perspective view showing an embodiment of the invention.
Figure 2:
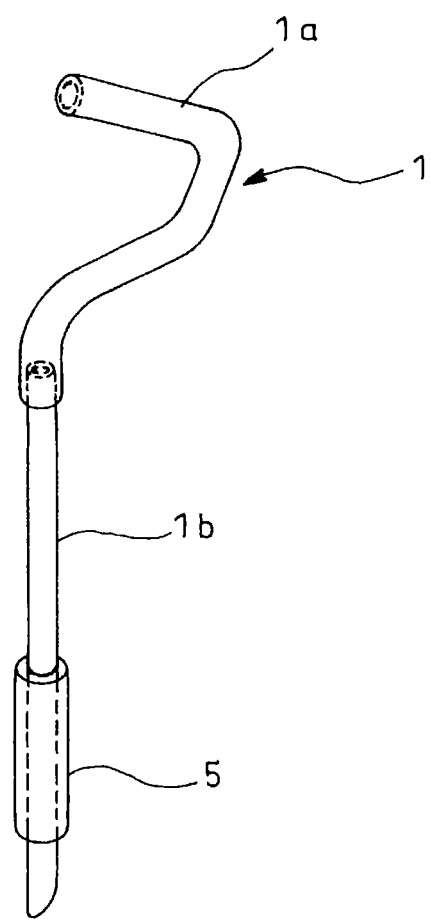
FIG. 2 is a perspective view showing alone the breather hose in FIG. 1.

FIGS. 1 and 2 show the embodiment of the invention in which reference numeral 1 denotes a pressure-releasing breather hose mounted on an urea water tank 2. The breather hose 1 dividably comprises a flexible joint portion 1a with one end capable of being fitted over a hose joint 3 on the urea water tank 2, and a vertical portion 1b connected to the other end of the joint portion 1a and suspending downward along a side surface of the tank 2. The joint portion 1a is constituted by a rubber hose made from ethylene propylene diene terpolymer (EPDM), and the vertical portion 1b is constituted by a polyethylene pipe (resin pipe) made from high density polyethylene (HDPE).

Especially in the embodiment, the joint portion 1a is preformed such that an end of the joint portion 1a extends straight over a required length in a projected direction of the hose joint 3 and is bent horizontally and substantially at a right angle to above a side surface of the urea water tank 2 where the other end of the joint portion 1a is bent downward.

Moreover, in the embodiment illustrated, the side surface of the urea water tank 2 is formed with a fixing groove 4 into which the vertical portion 1b of the breather hose 1 is fitted for fixing. A sleeve 5 made from ethylene propylene diene terpolymer is fitted over halfway of the vertical portion 1b so as to stably secure the vertical portion 1b to the fixing groove 4.

Thus, even if the urea water is waved in the urea water tank 2 due to vibrations or the like during running and urea-water droplets happen to flow into the breather hose 1, the urea-water droplets tend to hardly linger halfway of the vertical portion 1b, and receive the vibrations or the like during the running to flow through with a high degree of certainty since the vertical portion suspending downward along the side surface of the urea water tank 2 is constituted by a polyethylene pipe made from high density polyethylene with high water-repellent property. Thus, the urea crystals are suppressed from being precipitated near the lower end of the breather hose 1. As a result, precipitation of urea crystals near the lower end of the breather hose 1 is suppressed to prevent beforehand the breather hose 1 from being clogged due to time-depending development of urea crystals.

Moreover, only the vertical portion 1b of the breather hose 1 may be constituted by the polyethylene pipe; as to the joint portion 1a, any existing rubber hose may be utilized, so that production cost may be made relatively low.

The joint portion 1a with the one end fitted over the hose joint 3 on the upper portion of the urea water tank 2 has a highly humid inside which causes no precipitation of urea crystals, so that there is no fear of clogging even if the joint portion 1a is constituted by the rubber hose as is the case with the prior art.

Figure 3:
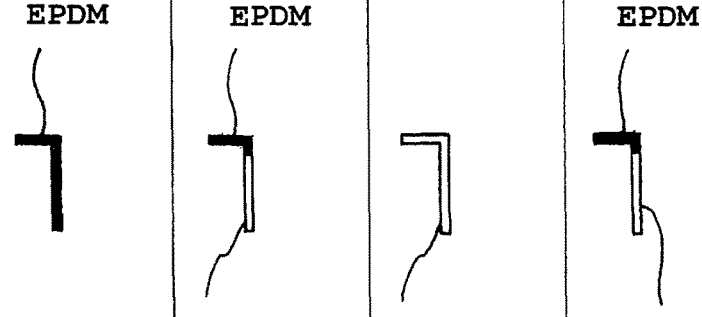
FIG. 3 is a table showing result in comparative test with different horse constitutions.

In fact, as shown in the table of comparative test with different hose constitutions in FIG. 3, presence/absence of total clogging was examined in a constant-temperature bath with urea water being poured at a predetermined flow rate and vehicle history being emulated, using Example A (prior art) where the breather hose 1 is constituted only by ethylene propylene diene terpolymer (EPDM), Example B where the joint portion 1a is constituted by ethylene propylene diene terpolymer (EPDM) and the vertical portion 1b is constituted by fluoro-rubber (FKM:vinylidene fluoride), Example C where the breather hose 1 is constituted only by fluoro-rubber (FKM: vinylidene fluoride) and Example D (the embodiment) where the joint portion 1a is constituted by ethylene propylene diene terpolymer (EPDM) and the vertical portion 1b is constituted by high density polyethylene (HDPE). As a result, it was confirmed that the total clogging is obviated only in the Example D corresponding to the embodiment and cannot be obviated in the other Examples A, B and C.

Thus, according to the above embodiment, owing to high water-repellent property possessed by the high density polyethylene, the urea-water droplets can hardly linger halfway of the vertical portion 1b and flow through with a high degree of certainty, whereby precipitation of urea crystals near the lower end of the breather hose 1 can be suppressed to prevent beforehand the breather hose 1 from being clogged. Moreover, the production cost can be suppressed to relatively low levels by constituting only the vertical portion 1b of the breather hose 1 by the polyethylene pipe and utilizing any existing rubber hose as to the joint portion 1a.

Moreover, especially in the embodiment, the joint portion 1a is preformed such that an end of joint portion 1a extends straight over a required length in a projected direction of the hose joint 3 and the other end is bent downward, so that prevented beforehand are fold and thus clogging of a connection between the one end of the joint portion 1a and the hose joint 3 on the upper portion of the urea water tank 2 as well as and a connection between the other end of the joint portion 1a and the vertical portion 1b.

It is to be understood that a breather hose for an urea water tank according to the invention is not limited to the above embodiment and that various changes and modifications may be made without departing from the scope of the invention. For example, the resin pipe is not limited to a polyethylene pipe made of high density polyethylene (HDPE).

REFERENCE SIGNS LIST

1 breather hose
1a joint portion
1b vertical portion
2 urea water tank
3 hose joint

The invention claimed is:

1. A pressure-releasing breather hose for a urea water tank, the pressure-releasing breather hose comprising:
    a flexible joint portion with an end capable of being fitted over a hose joint on an upper portion of the urea water tank, the flexible joint portion of the pressure-releasing breather hose constituted by a rubber hose; and
    a vertical portion connected to the other end of said joint portion and suspending downward along a side surface of the urea water tank, the vertical portion of the pressure-releasing breather hose constituted by a resin pipe,
    wherein the urea water tank is open at the upper portion to atmosphere through the vertical portion and the joint portion,
    wherein the vertical portion extends along the side surface of the urea water tank to near a bottom of the urea water tank,
    wherein the side surface of the urea water tank includes a groove into which the vertical portion is fated, and
    wherein a sleeve is fitted over the vertical portion to secure the vertical portion in the groove.

2. The breather hose for an urea water tank as claimed in claim 1, wherein the resin pipe is a high density polyethylene pipe.

3. The breather hose for an urea water tank as claimed in claim 1, wherein the joint portion is preformed such that the joint portion extends straight at its one end in a projecting direction of the hose joint and is bent downward at the other end thereof.

4. The breather hose for an urea water tank as claimed in claim 2, wherein the joint portion is preformed such that the joint portion extends straight at its one end in a projecting direction of the hose joint and is bent downward at the other end thereof.

* * * * *

UNITED STATES PATENT AND TRADEMARK OFFICE
CERTIFICATE OF CORRECTION

PATENT NO. : 9,835,070 B2
APPLICATION NO. : 14/241098
DATED : December 5, 2017
INVENTOR(S) : Hiroshi Urushibara et al.

Page 1 of 1

It is certified that error appears in the above-identified patent and that said Letters Patent is hereby corrected as shown below:

In the Claims

In Column 6, Line 11, change "fated" to "fitted"

Signed and Sealed this
Sixteenth Day of April, 2019

Andrei Iancu
*Director of the United States Patent and Trademark Office*